(12) United States Patent
Hansen

(10) Patent No.: US 7,680,720 B1
(45) Date of Patent: Mar. 16, 2010

(54) MANAGING CHANGES AMONG MULTIPLE LIFE CYCLE PLANS

(75) Inventor: George Hansen, Danville, CA (US)

(73) Assignee: Intuit Inc., Mountain View, CA (US)

( * ) Notice: Subject to any disclaimer, the term of this patent is extended or adjusted under 35 U.S.C. 154(b) by 238 days.

(21) Appl. No.: 11/680,132

(22) Filed: Feb. 28, 2007

Related U.S. Application Data

(63) Continuation of application No. 09/580,670, filed on May 26, 2000, now abandoned.

(51) Int. Cl.
G06Q 40/00 (2006.01)

(52) U.S. Cl. ............................ 705/36 R; 705/35; 705/37

(58) Field of Classification Search ................... 705/35, 705/36, 36 R, 37
See application file for complete search history.

(56) References Cited

U.S. PATENT DOCUMENTS

| | | | |
|---|---|---|---|
| 6,430,542 B1 * | 8/2002 | Moran | 705/36 R |
| 6,684,190 B1 * | 1/2004 | Powers et al. | 705/36 R |
| 7,050,997 B1 * | 5/2006 | Wood, Jr. | 705/36 R |
| 7,149,713 B2 * | 12/2006 | Bove et al. | 705/36 R |
| 7,231,608 B1 * | 6/2007 | Fano et al. | 715/760 |
| 7,363,263 B1 * | 4/2008 | Magaram et al. | 705/35 |
| 7,409,364 B1 * | 8/2008 | Barton et al. | 705/35 |

* cited by examiner

*Primary Examiner*—Nga B. Nguyen
(74) *Attorney, Agent, or Firm*—Osha • Liang LLP

(57) ABSTRACT

A system and method for making life cycle plans includes a planning engine, an input/output module, a user interface, and financial planning software. The planning engine maintains a plurality of items associated with one or more life cycle plans. Each item has one or more variables, which store data. Each item additionally maintains information about its status within each plan. For each plan, the individual item may be active, inactive, or not present in the plan. When a second or subsequent plan is created, only those items having new or changed variable values are recreated. Instead of each item being copied to the second plan, the item instead maintains state information indicating its state within each plan.

10 Claims, 7 Drawing Sheets

Item 1, Time $T_1$

| $V_1, V_2, V_3$ | |
| --- | --- |
| Plan | 1 |
| State | Active |

Item 1, Time $T_2$

| $V_1, V_2, V_3$ | | |
| --- | --- | --- |
| Plan | 1 | 2 |
| State | Active | Active |

Item 1, Time $T_3$

| $V_1, V_2, V_3$ | | |
| --- | --- | --- |
| Plan | 1 | 2 |
| State | Active | Inactive |

Item 2, Time $T_3$

| $V_1, V_2, V_3'$ | | |
| --- | --- | --- |
| Plan | 1 | 2 |
| State | Not Present | Active |

MANAGING CHANGES AMONG MULTIPLE LIFE CYCLE PLANS

CROSS-REFERENCE TO RELATED APPLICATIONS

This application is a continuation of U.S. patent application Ser. No. 09/580,670, filed on May 26, 2000, which is incorporated by reference herein in its entirety.

BACKGROUND OF THE INVENTION

1. Field of Invention

The invention relates to planning life-cycle events. More particularly, the invention relates to a system and a method for analyzing the results of changes to life-planning decisions.

2. Description of the Related Art

The advent of accounting software for personal computers has allowed greater and simplified access to individual banking and other financial data. Consumers are able to pay their bills, buy stocks and other financial instruments, renegotiate their mortgages, and plan strategies for saving money and freeing themselves of debt—all by using their PCs.

In addition to the increased efficiency resulting from this trend, a consequence of having the majority of one's financial life recorded in one place—i.e. in computer data files—is the ability to do family financial planning with relative ease. Existing software programs, such as Quicken 99™ by Intuit Inc. of Mountain View, Calif., allow a user to compute the amount of money that will be available at some future date, e.g. at retirement, as a result of financial decisions made today, or in the near future. For example, a user might be interested in knowing how much money she will have ten years from today, based on current saving and spending patterns.

A significant impediment to this process of financial planning is the difficulty of comparing the results of different life decisions made throughout the planner's lifetime. Because a planning timeline, i.e. the period over which the plan will operate, can be anywhere from weeks to several decades, changes in variables can have effects years into the future. For example, a slight decrease in interest rates can significantly reduce the amount of interest income over the course of the plan, leaving less money available for education, miscellaneous capital expenditures, retirement, and testamentary devises. Likewise, a capital expense now, e.g., the purchase of a car, means not only the loss of that capital, but also the return that would have been realized on that capital over the remaining n years of the plan.

While these are two illustrative examples, the complexity of life cycle planning is such that many such decisions, i.e. variables, must be made over the course both of living a life, and of making a life cycle plan. Each of these variables can affect the plan in significant ways, and likewise interact with other variables.

The difficulty with today's life cycle planning software is that it is both cumbersome and inefficient. In order to compare two plans having one or more differing variables, a base plan must be duplicated, and the value of the old variable(s) replaced with the new values in the modified plan. Because there are so many variables to input in order to form the plan, finding the one to change can take a significant amount of time. Even worse, if the user wants to restore the plan to its original value, she has to a) find it again; and b) remember what it was set to originally. If the user wishes to compare more than two plans, then yet another copy of the plan must be made. In addition to the inconvenience and unwieldiness of duplicating the plans, there is, from a memory management perspective, a significant amount of inefficiency in replicating a plan comprising hundreds or thousands of variables simply to change a very small number of variables.

Accordingly, it is desirable to provide a new method of life cycle planning, in which it is easy for the user to rapidly assess the results of changing the value of one or more plan variables. It is desirable to provide a side-by-side (or similar visual) comparison of the plans, including a clear indication of where and how the variables differ. The user should be able to undo or reverse the changes, gradually or instantly removing the differences between, e.g., plans A and B, and should be able to immediately view the results of the changes, as described above.

In addition, it would be desirable for the memory requirements of the second and subsequent plans to be substantially less than the memory required by the first plan—i.e. if the memory requirement of one plan is m, the memory requirement for n plans should be closer to m than to n·m.

SUMMARY OF THE INVENTION

The present invention provides a system and method for making life cycle plans which allows for efficient development of multiple plans without requiring complete duplication of prior plans. A number of life cycle plans are maintained. Each life cycle plan includes a plurality of items, each of which has one or more variables that store data used to calculate the result of the plan. Each item additionally maintains information about its status within each plan. For each plan, the individual item may be active, inactive, or not present in the plan. When a second or subsequent plan is created, only those items having new or changed variable values are updated to indicate their new value, and the plan to which the new value applies. Instead of each item being copied to the second plan, the item instead maintains state information indicating its state within each plan. The result of a selected life cycle plan can then be calculated by determining for the selected life cycle plan, which items are active in the plan, and using those items to calculate the result.

An embodiment of the invention provides a life cycle planning system, including a planning engine, an input/output module, and a user interface, and optionally an additional financial management application. The user interface allows the user to create new plans, and then select items to be included in the plan, and update their variables with new values. The input/output module routes data between the planning engine, the user interface, and other components of the financial planning application. The planning engine uses data supplied by the user to determine the results of a life cycle plan, and updates the results of the plans using only the items that are active in each plan. The invention also has embodiments as a computer program product on a computer readable media, and as part of a computer system.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE SEVERAL VIEWS OF THE DRAWINGS

FIG. 5 is a temporal chart illustrating changes in item information at certain times in accordance with one embodiment of the present invention.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
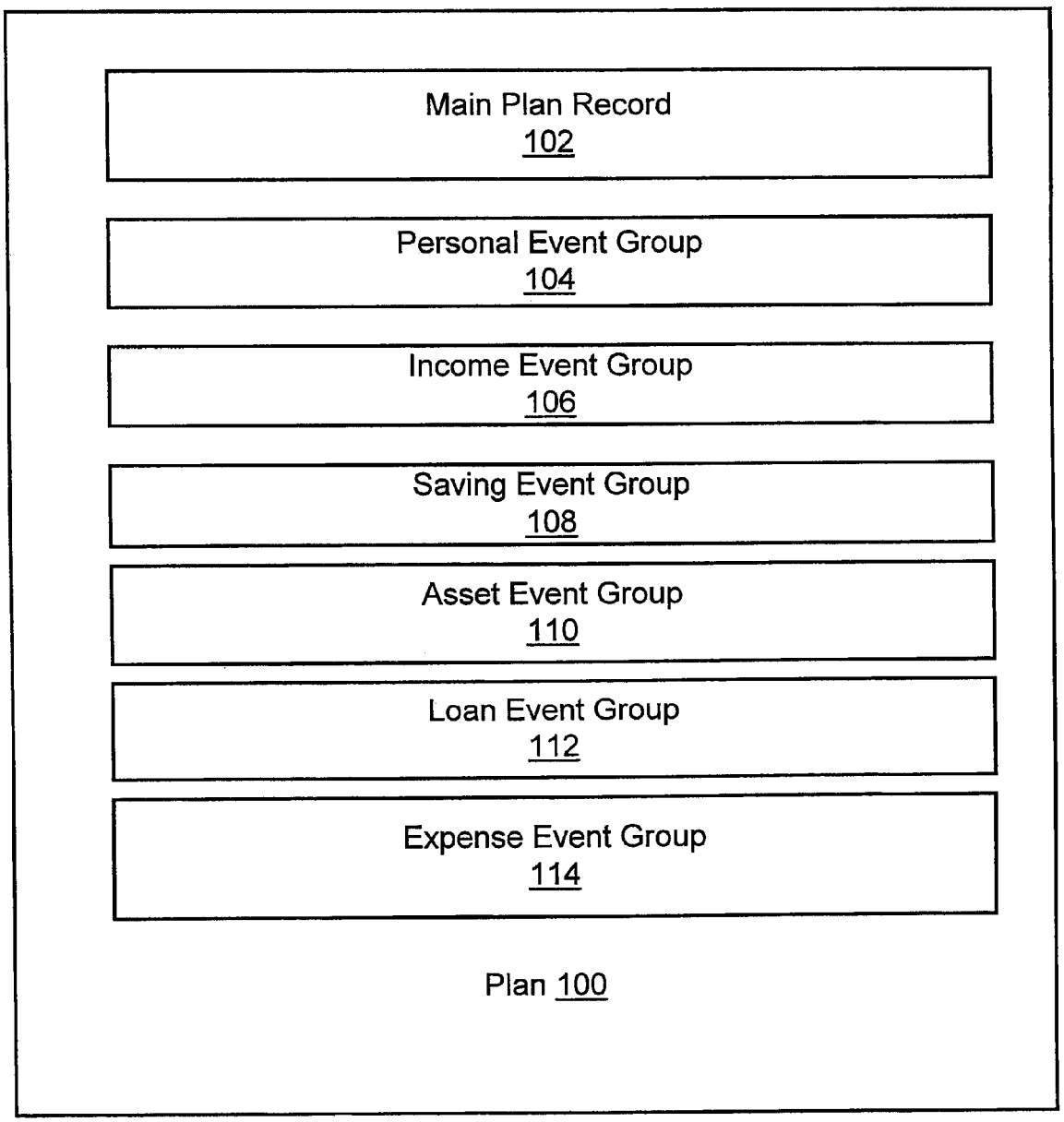
FIG. 1 is a block diagram illustrating a functional layout of a plan in accordance with one embodiment of the present invention.

Referring now to FIG. 1, in a preferred embodiment, the primary data structure is a plan 100. A plan 100 contains information about a user—past, present, and future, and indicates the expected consequences of the user's decisions over the course of his lifetime, and how those decisions affect the user's indicated goals. Although other structures will be readily apparent to those skilled in the art, in the preferred embodiment, a plan 100 contains information organized into the following event groups:

A Main Plan Record 102, which contains information that typically exists in fixed numbers. For example, the Main Plan Record could contain inflation rate and tax rate information that applies throughout the plan.

A Personal Event Group 104, which contains information about the members of the plan. For example, the user himself, his spouse, and any dependents of the user.

An Income Event Group 106, which contains information on the income of the plan members, such as salaries, pensions, social security benefits, etc.

A Saving Event Group 108, which contains information about the plan members' savings plans for their various accounts over a specified period.

An Asset Event Group 110, which contains information about each asset that the plan members own and will own in the future.

A Loan Event Group 112, which contains information about each loan that the members of the plan have or intend to take out in the future.

An Expense Event Group 114, which contains information about expenses during the plan period, including adjustments to ongoing living expenses.

Note that in this embodiment, assets and loans are tracked in terms of future assets and future loans. Data regarding present assets and loans is received via an interface to a conventional financial management application 212 (FIG. 2), e.g., Quicken 2000™, by Intuit Inc. of Mountain View, Calif. In an alternate embodiment, the event groups may directly contain information about the current assets and liabilities (or other pertinent current financial parameters).

Figure 3:
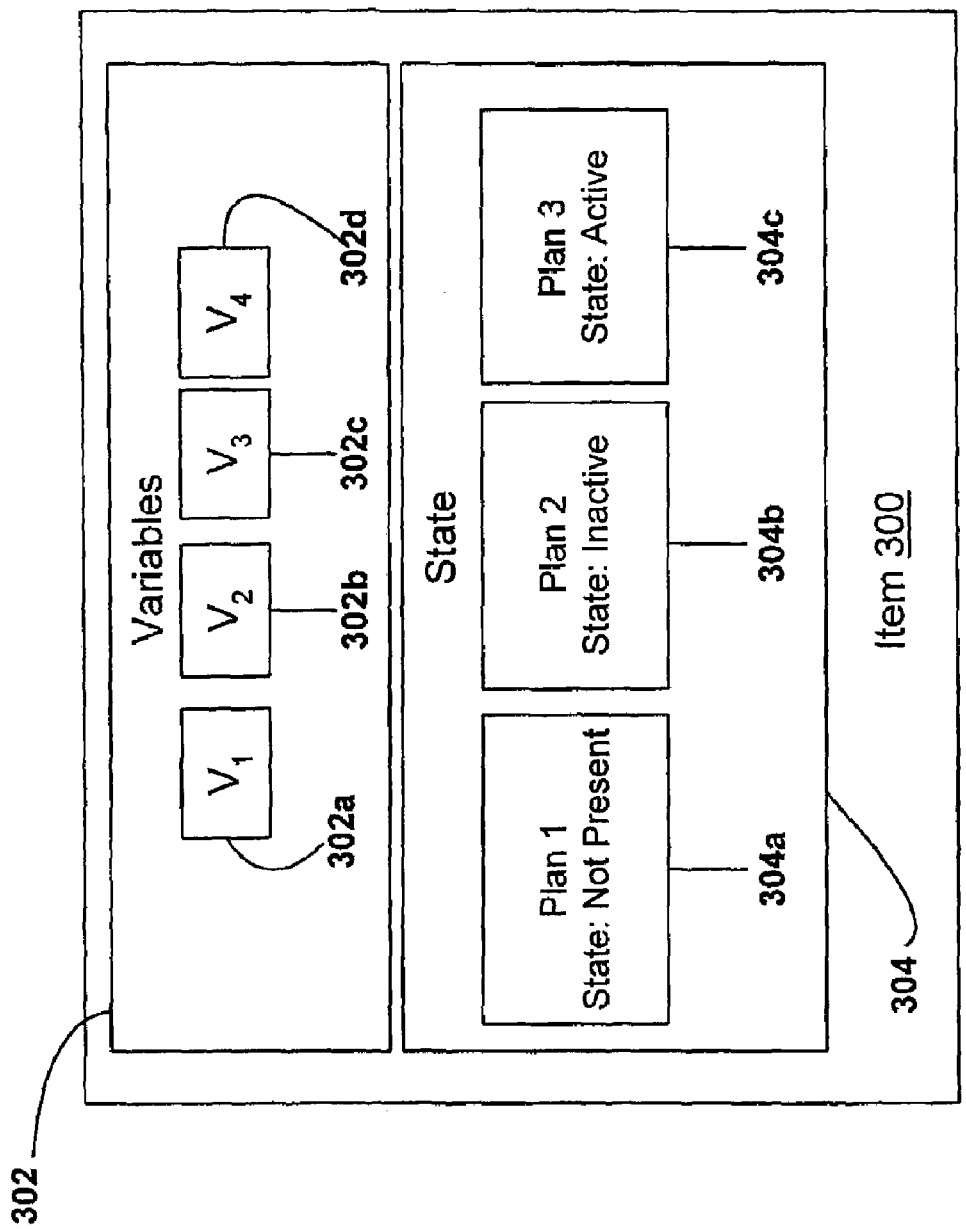
FIG. 3 is a functional block diagram illustrating the components of an item in accordance with the present invention.

Referring now to FIG. 3, there is shown a block diagram of an embodiment of an item 300. Each event group in the plan 100 contains one or more items 300, which contain collections of variables 302 and state information 304. A variable 302 may be any item of data used for purposes of calculating plan results. The variables 302 are preferably related in a relatively close manner, e.g. education expenses, number of years of education, etc., as relevant to the event group they are in. For example, for the loan event group 112, each item 300 would be a loan, and the variables 302 would be the terms of the loan, i.e., amount, interest rate, length, and so forth. As another example, in the personal event group 104, each item 300 may identify a member of the user's family, with variables 302 for the member's name, year of birth, status as dependent, expected date of retirement or enrollment in college, and so forth. The values of these variables may be established through a suitable user interface (UI) 210, for example, forms with data entry fields, or a wizard to obtain the variable data in a question and answer format. In this manner, the user may establish the values for the various variables 302 of each item. In addition, the user interface 210 preferably supports direct editing and modification of variable values.

An item 300 is an object that exists independently of a plan 100. Each item 300 stores state information 304, which indicates whether the item is to be used in calculating the results of the plan—that is whether or not the item contributes to the plan results.

In a preferred embodiment, this is done by maintaining the state information 304 in an array within (or associated with) the item 300. For example, for each plan 100, an associated index of the item's array can indicate the item's 300 status relative to the plan 100; e.g. not present, turned off (inactive), or turned on (active). While one embodiment uses three states, an alternative embodiment can use only two states: active or inactive. An item that is "active" is one that contributes to the results of a given plan. An item that is "inactive" or "not present" does not contribute to the plan. Further, when an item is "inactive," the user can make the item "active" in the user interface, while for items that are "not present," the item need not appear in the user interface for that plan.

For example, in FIG. 3, there is shown an illustration of an item 300. Item 300 contains a group of variables 302, as well as state information 304 about associated plans.

In the illustrated case, the state information 304a for Plan 1 indicates that the item 300 is not present in Plan 1. This could occur, for example, when the item 300 was not part of the original plan 100, but was added subsequently when a new plan was created (e.g., a new loan that is added after Plan 1 was created and so not calculated in Plan 1's result). The state information 304b for Plan 2 indicates that item 300 is present in Plan 2, but is inactive. This indicates that while Plan 2 originally contained the item 300, it has been at least temporarily deactivated within Plan 2, and so does not affect the calculated result of this plan (e.g., a loan in Plan 1 is deactivated in Plan 2). The Plan 3 state information 304c illustrates that the item 300 is present and active in Plan 3, and so is used in calculating the result.

Figure 2:
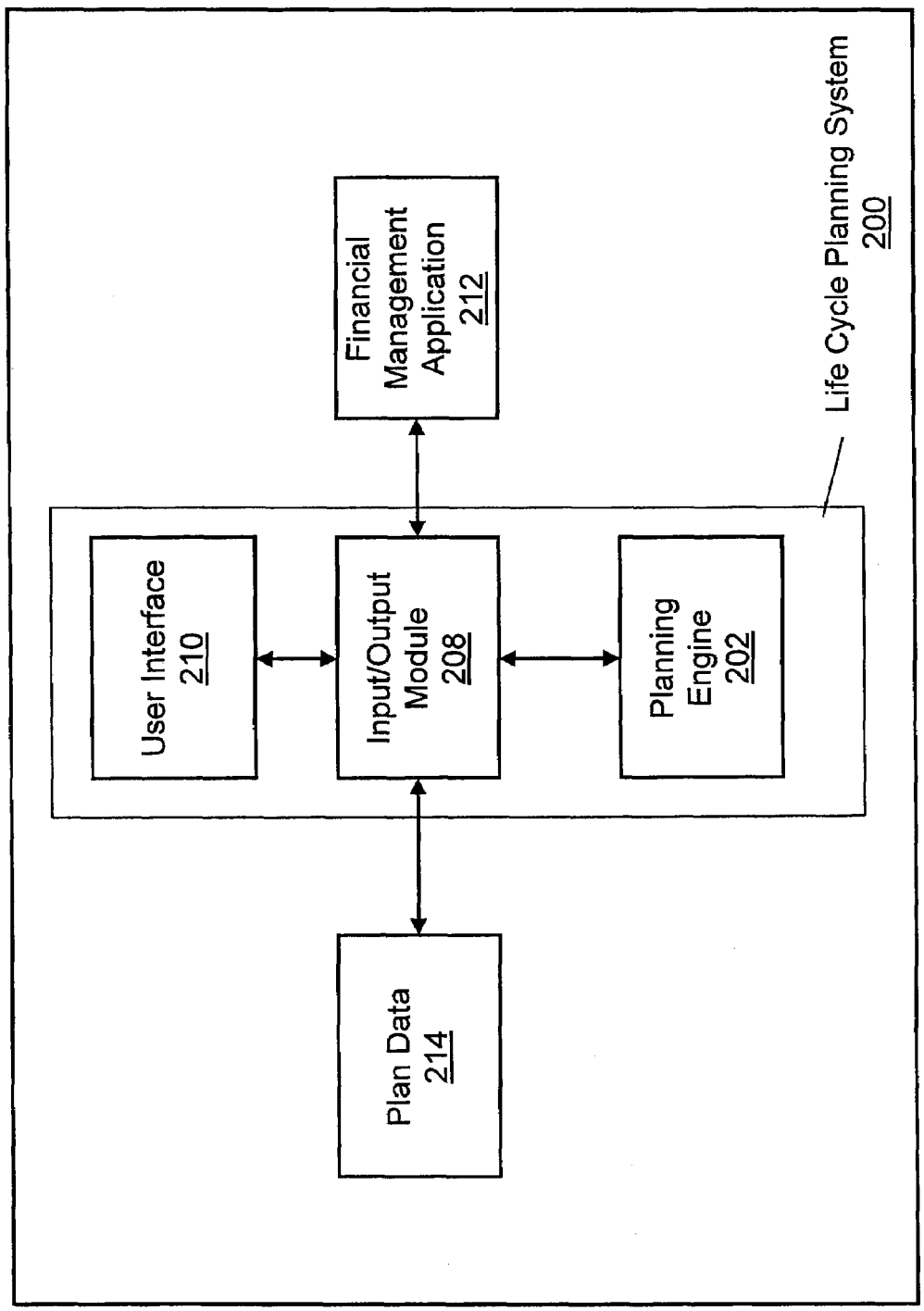
FIG. 2 is a functional block diagram illustrating the processing and data components of the present invention.

Referring now to FIG. 2, there is shown a block diagram of a life cycle planning system 200 in accordance with an embodiment of the present invention. The planning system 200 includes a Planning Engine 202, an Input/Output Module 208, and a User Interface 210. The Planning Engine 202 is coupled to Input/Output Module 208. The Input/Output Module 208 is coupled to the User Interface 210, and to Financial Management Application 212. The Input/Output Module 208 receives data from the User Interface 210 and updates Plan Data 214, which stores one or more plans 100. The Input/Output Module 208 provides Plan Data 214 to the Planning Engine 202. The life planning system 200 is executed by a conventional computer including memory, the storage device and processor. Note that while shown separately, Financial Management Application 212 and life cycle planning system 200 can be combined into a single application.

The Planning Engine 202 is responsible for collecting all of the data required to form a plan 100, creating the plan 100 from the supplied data, and updating the plan 100 upon receiving new or changed data by calculating the new result of the plan. Communication is had with the user via User Interface 210, while the plan data 100 is stored in persistent storage.

In a preferred embodiment, a user maintains a list of his accounts, which may be income, saving, asset, loan, expense, investment or other accounts in Financial Management Application 212. The life planning application 200 has an interface to the Financial Planning Software 212, in order to request data from it. When this information is available to the Planning Engine 202, it will be used to assign data to many of the planning variables 302. When this information is not available, the user will input it, if it is required in order to form a plan 100.

In addition to receiving data directly from Financial Management Application 212, the Planning Engine 202 is linked to Input/Output Module 208, which is capable of communication with the user via User Interface 210, and of transmitting data back to the Planning Engine 202. The Input/Output Module 208 may function as a wizard or a direct editor of the plan data 100.

To store input data, the Planning Engine 202 initializes the item 300 associated with that type of data, and the variables 302 within the item 300. In addition, in a preferred embodiment, the item 300 has an array. The index of the array represents a plan number, and the value of the array indicates the status of the item 300 in the plan 100 represented by the given index. When the first plan 100 is created, each included item 300 will be in only one plan 100, i.e. Plan 1, and will be marked active.

Once the necessary data has been entered into item 300, the Planning Engine 202 then uses conventional functions and algorithms to determine the life cycle plan results. Those of skill in the art appreciate that although increasing the amount of data provided to the plan results in a more detailed plan, the Planning Engine 202 can operate (and form a resulting plan) using only a minimum set of data. Once the results of the plan are determined, they are presented to the user via the Input/Output Module 208 and the User Interface 210. The results will typically include the values of many calculated variables, such as the amount of money available at retirement, funds available for college enrollment of children, size of estate at death, etc.

The user can then analyze various "What If" scenarios, by changing any number of the variables in the items, creating new items, or deleting items from plans. This may be done, for example, by direct inspection, or by making use of a wizard. For example, the user might be interested in knowing what is the financial impact of his child going to Harvard University instead of to The University of California. Because of the difference in tuition, room and board, and expenses between the two schools, there could be a significant change to the life cycle plan 100 as a result. Thus, in order to see a comparison of the two possibilities, a new plan 400 must be created.

Figure 4:
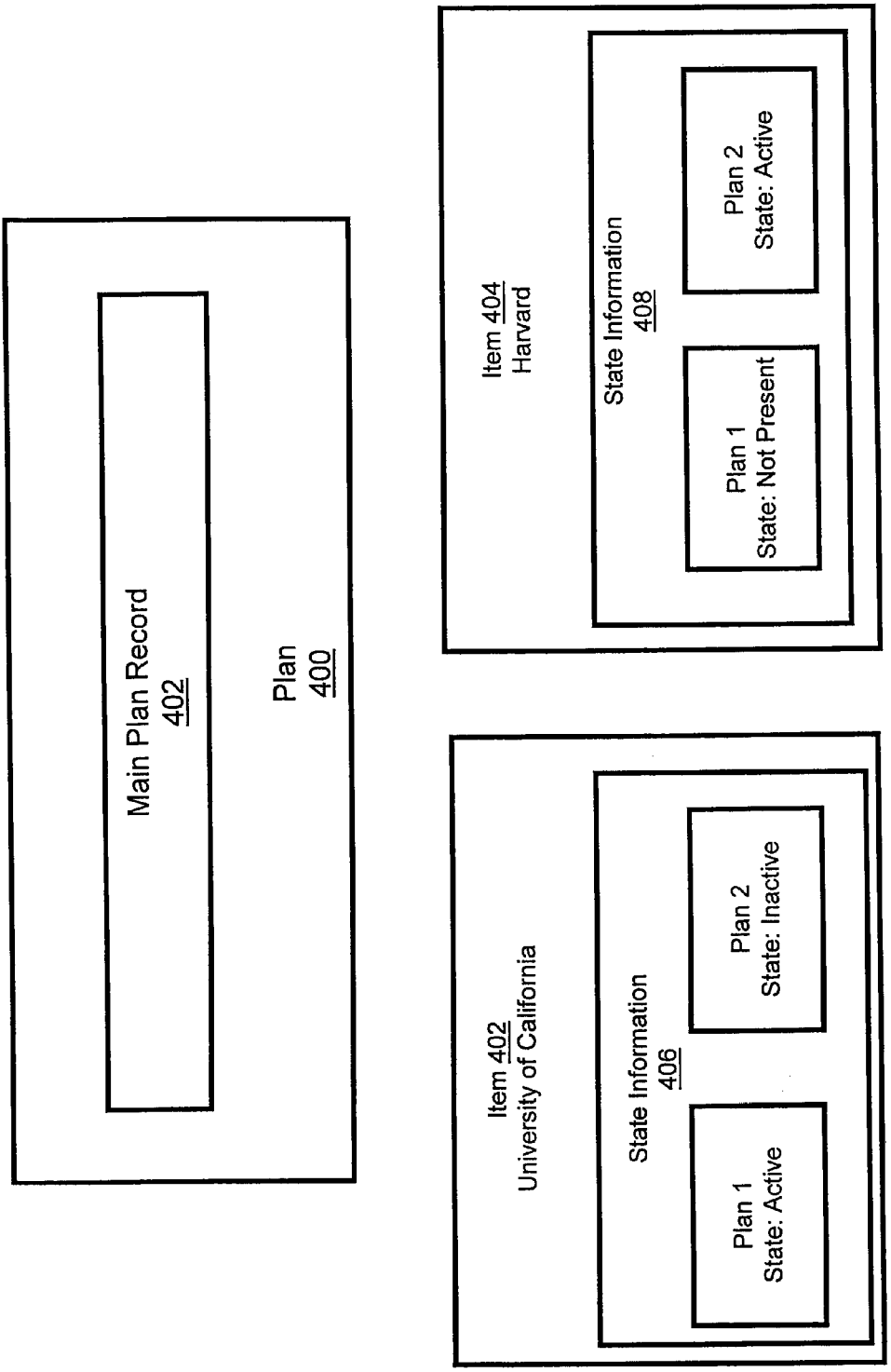
FIG. 4 is a block diagram illustrating a functional layout of a newly-formed plan in accordance with one embodiment of the present invention.

Referring now to FIG. 4, there is shown a block diagram illustrating a functional layout of a newly formed plan 400. The new plan 400 is formed by creating a new instance of a plan, containing only a main plan record 402, and thereby saving memory by avoiding the duplication of an entire plan. Next, for every existing item 300 in the base plan 100, a new index is added to the item's array, and the value of the array at that index is set to the same value as in the plan 100 being altered. For example, if the only change is in the selection of colleges, then all other items and variables (e.g. income, loans, assets, etc.) are the same, and so for each of these unvaried items, the state information 304 for these items with respect to the new plan 400 is marked as active. After this, if any of these items is altered for the new plan 400, its state information 304 (e.g. index values) is set to "inactive" or "not present" for the new plan 400, as appropriate. Thus, in an item that defines the tuition, room and board and expenses for attending college at The University of California, the state information for the original item with respect to the new plan is marked inactive.

Next, one or more new items 300 are created reflecting the changes made by the user. These items 300 will be set to active only for the new plan 400, and inactive or not present for all other plans, as appropriate. Thus, a new item 300 with variables defining the tuition, room and board, and expenses at Harvard is created, and the state information for the prior plan is marked as not present, and the state information for the new plan 400 is marked as active. Additionally, a log can be kept indicating the changes made by the user.

As yet another example, FIGS. 5a-5d illustrate the operation of an embodiment of the present invention with respect to an item containing three variables. Assume only for purposes of illustration that the user has chosen to make two plans, and would like to compare the results of each. Thus, the user will first create the first plan, and then will create the second plan. Those of skill in the art appreciate that the following discussion could extend to cases in which more than two plans are created.

Referring now to FIG. 5a, initially the user has created the first plan. Thus, at time $T_1$, Item 1 contains three variables, $V_1$, $V_2$, and $V_3$. To determine the state value 502 of Item 1 for Plan 1 at this time, the first index of the state array is examined. In this case, the first index has a value of "Active" indicating that for Plan 1, Item 1 is active in Plan 1.

Next, the user creates the second plan. As described above, this can be done in different ways, depending on the particular user interface 210. Referring now to FIG. 5b, there is shown again Item 1, this time at time $T_2$. FIG. 5b illustrates that the second plan, represented by a number "2" in the plan array index, has now been created. As the figure illustrates, the state information 504 for Plan 2 indicates that Item 1 is active in Plan 2, which is to be expected, since at creation of the new plan, the state information for each item is simply replicated from the base plan, as described above.

Referring now to FIG. 5c, Item 1 is shown at time $T_3$. As can be seen, the status 506 of Item 1 in Plan 2 is "Inactive," meaning that Item 1 is now inactive in Plan 2, which is desirable, given that Item 2 will replace Item 1 in Plan 2.

Referring now to FIG. 5d, Item 2 is shown, also at time $T_3$. Item 2 differs from Item 1 in that variable $V_3$ is not present, and has instead been replaced by variable $V_3'$. Item 2 has status information 508 of "Not Present" for Plan 1, indicating it is not present in Plan 1. This is easily understood, as Item 2 did not exist in Plan 1, and was created only to form part of the new plan, Plan 2. Item 2 is marked with status indicator "Active," indicating that it is active in Plan 2.

Each of FIGS. 5a-5d is illustrative of the process described above, in which Plan 2 is initially created with the same attributes as Plan 1; but certain variables and items are then altered in accordance with input from the user.

Figure 6:
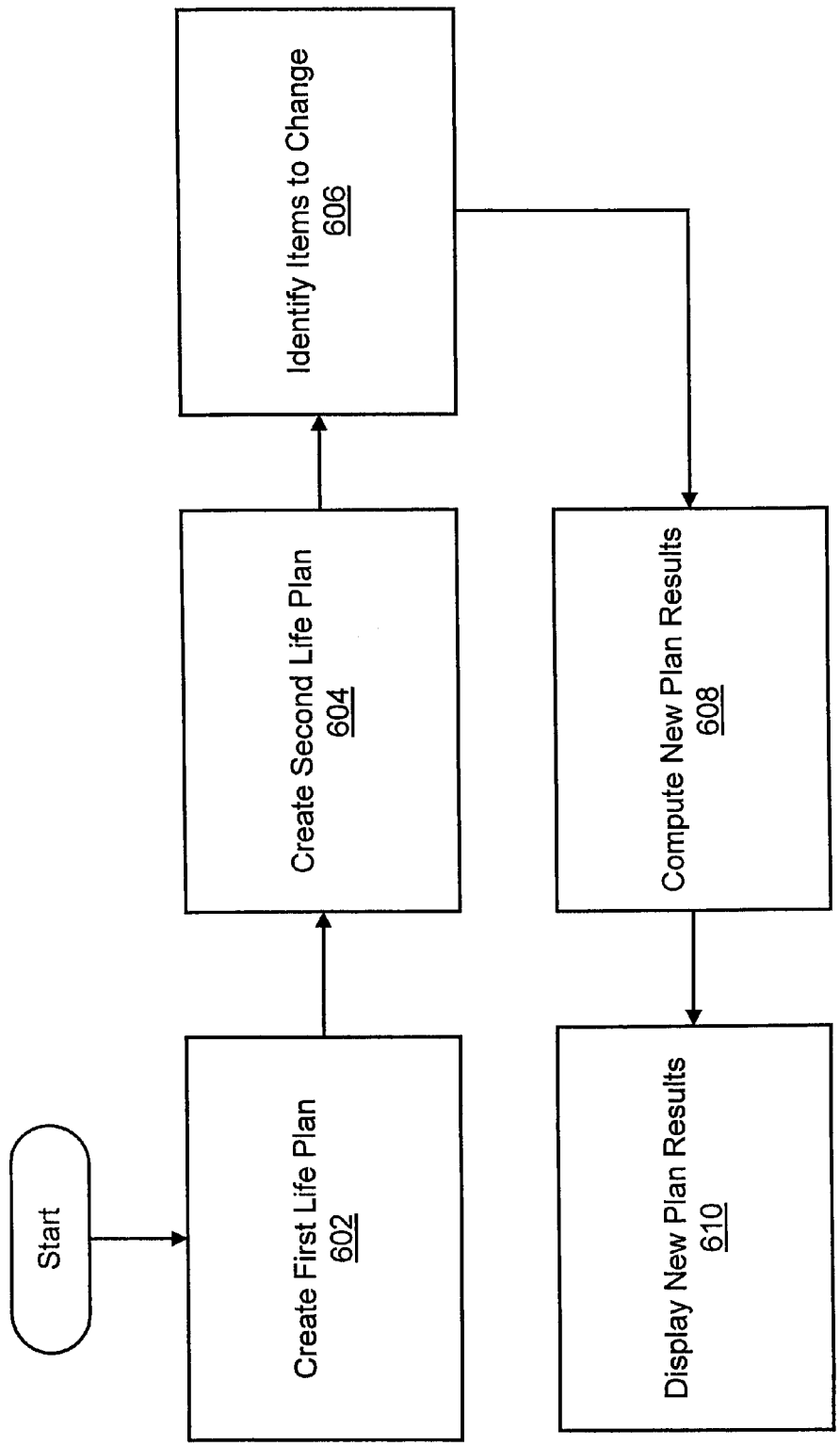
FIG. 6 is a flow chart illustrating the steps of the operation of one embodiment of the present invention.

Referring now to FIG. 6, there is shown a flowchart illustrating the operation of one embodiment of the present invention. In the first step, a first life 100 plan is created 602. Next, the user indicates a desire to alter some element of the first plan 100. This results in the creation 604 of a second life plan 400, with the creation of a new main plan record. The Planning Engine 202 next identifies 606 any items 300 that are to be changed in the new plan 400. The Planning Engine 202 can then compute 608 the results of the new plan 400, and display 610 the results to the user, e.g. via the Input/Output Module 208 and the User Interface 210.

Because the second plan 400 is created by updating the state information of the items 300 that have been previously defined and reused in the second plan 400 and adding only new or changed items, changes can be made and viewed rapidly. The Planning Engine 202 can compute new plans 400 much more efficiently than would be the case if all items 300 were duplicated each time a variable 302 is changed. The user can repeatedly change variables 302 back and forth between different values while viewing updated results graphically, or in any other way made possible by the UI 210.

In a preferred embodiment, a log is maintained of changes made by the user between plans. In alternative embodiments, a list of these changes can easily be formed by determining which plans have differing items 300, and reporting the differences to the user. As illustrated above, the user can easily restore each variable 302 to its original value. The UI 210 can additionally provide a command that will cause all changes to be undone at once. In this case, the Planning Engine 202 need only set all item states 304 to Inactive for plans other than the first plan 100.

The memory requirements of each new plan 400 created after the first plan 100 are significantly less than would be required if the first plan 100 were merely duplicated. A typical plan might have, for example, 1000 items 300. If the total memory size of the plan 100 is m, then the memory size of each item 300 is approximately m/1000. If the entire plan 100 is copied, the new plan 400 will require additional memory of size m. However, using the present invention, if even ten items 300 are changed at once, only additional memory of size (10·m/1000)=m/100 will be required. In this case, only an additional 1% of memory is needed, as opposed to the 100% that could be required by a duplication of the plan. The memory savings tend to increase further as additional new plans are created based on prior plans.

Figure 7:
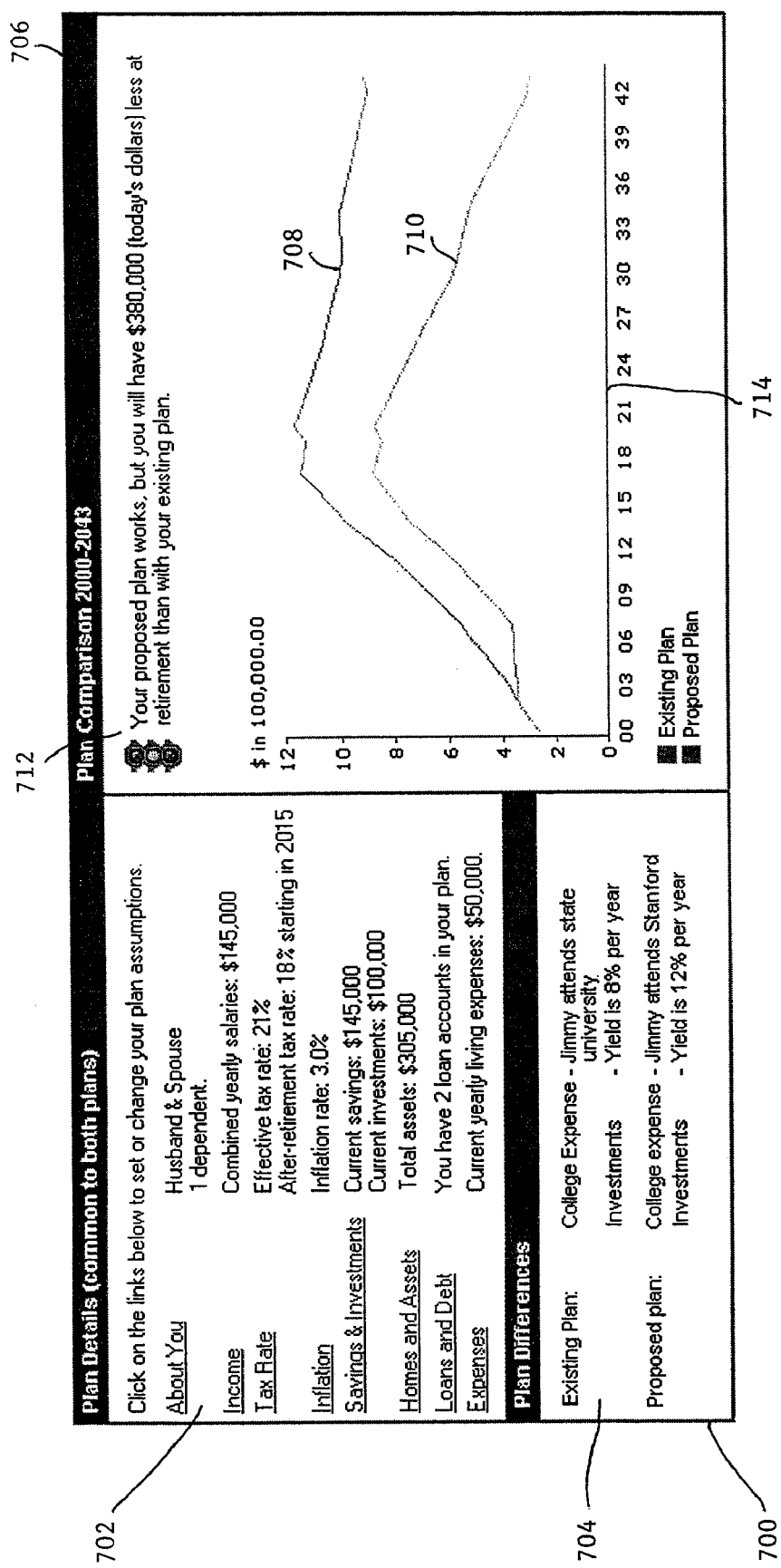
FIG. 7 is a screen shot illustrating a user interface display of an embodiment of the present invention.

Referring now to FIG. 7, there is shown a screen shot 700 of an embodiment of the present invention. In the illustrated embodiment, the user interface 210 is displaying a comparison of two life cycle plans 100, 400. The common details of each plan are reported in region 702, and include demographic and financial information about the members of the plan. As shown in region 702, the plan members are husband and spouse, with one dependent, having combined yearly salaries of $145,000, an effective tax rate of 21%, and an after-retirement tax rate of 18% starting in year 2015. Inflation is predicted to be 3.0%. The plan members have current savings of $145,000, and current investments valued at $100,000. Their total assets are $305,000, and they have two loan accounts. Their current yearly living expenses are $50,000.

The next region 704 of the screen shot 700 depicts the differences between the two plans 100, 400. As illustrated, there are two differing premises between the plans, in the existing plan (i.e., Plan 1), dependent Jimmy will attend the state university, and the return on the family's investments will yield 8% per year. In the proposed plan (i.e. Plan 2), Jimmy attends Stanford, and the family's investments will yield 12% per year.

Region 706 of the screen shot 700 shows the results of the plans, and summarizes the differences. In the described example, Plan 2 meets the goals defined by the user, and thus "works," but as described in the text 712 of region 706, the user will have $380,000 less of today's dollars at retirement age than the user would have had with the existing plan (Plan 1). This is then further illustrated by graph 714, which shows line graphs 708, 710 of the amount of money available in the plan under Plan 1, and Plan 2. Thus, the user can clearly and immediately see the changes that he has made to the existing plan, and the consequences of those changes.

As will be understood by those familiar with the art, the invention may be embodied in other specific forms without departing from the spirit or essential characteristics thereof. For example, an item may contain more or fewer states than the three described above. Likewise, the particular capitalization or naming of the modules, protocols, features, attributes, data structures, or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

I claim:

1. A computer system for making multiple life cycle plans, comprising:

a user interface including data entry elements for receiving life cycle planning data from a user and displaying plan results to the user;

a processor to execute a planning engine, coupled to the user interface, and to perform the steps of:

allocating the planning data to a plurality of items, each item having at least one variable, and each item configurable to indicate whether the item is active or inactive in each of a plurality of life cycle plans, the plurality of life cycle plans comprising a first life cycle plan associated with a first goal and a second life cycle plan associated with a second goal;

determining a plan result for each of the plurality of life cycle plans using only the items that are active in the life cycle plan, each of the plurality of life cycle plans associated with a common item of the plurality of items;

determining an updated value for an item variable of the common item, wherein a single copy of the common item is accessed for use in each of the first plan and the second plan;

determining a first updated plan result for the first life cycle plan according to the updated value for the item variable of the common item, the first updated plan result specifying whether the first goal is achieved; and determining a second updated plan result for the second life cycle plan according to the updated value for the item variable of the common item, the second updated plan result specifying whether the second goal is achieved; and a storage device to store the plurality of items, wherein a single copy of the common item is accessed on the storage device for use in each of the plurality of life cycle plans.

2. A computer-implemented method for managing multiple life cycle plans, each plan including at least one item, each item having at least one variable, the results of a plan depending on the values of variables of the items of the plan, the method comprising:
- determining values of item variables for a first set of items, at least one of the values being determined using a financial management application executing on the computer;
- constructing, using a processor of the computer, a first plan associated with a first goal according to the first set of items, and storing an indication that each item in the first set of items is active in the first plan on a storage device of the computer;
- determining, using the processor, values of item variables for a second set of items, at least one of the values being determined using the financial management application;
- constructing, using the processor, a second plan associated with a second goal according to the second set of items, the second set of items including at least one common item from the first set of items stored on the storage device, and storing an indication that each item in the second set of items is active in the second plan on the storage device;
- determining, using the processor, a result for each plan according to the items active in the plan;
- determining, using the processor, an updated value for an item variable of the at least one common item, wherein a single copy of the common item is accessed for use in each of the first plan and the second plan;
- determining, using the processor, a first updated result for the first plan according to the updated value for the item variable of the at least one common item, the first updated result specifying whether the first goal is achieved;
- determining, using the processor, a second updated result for the second plan according to the updated value for the item variable of the at least one common item, the second updated result specifying whether the second goal is achieved; and
- displaying, using the processor, the first updated result and the second updated result.

3. The computer-implemented method of claim 2 further comprising:
- storing an indication that each item not in the second set of items is not active in the second plan.

4. The computer-implemented method of claim 3 further comprising:
- receiving an indication that an item not in the second set of items should be added to the second plan;
- storing an indication that the item is active in the second plan;
- determining a new result for the second plan according to the second set of items and the item for which an indication was received; and
- displaying the new result.

5. The computer-implemented method of claim 2 further comprising:
- receiving a new value of an item variable of one of the items in the first set of items;
- determining a new result for each plan including the item; and
- displaying the new result.

6. A computer-readable medium including computer program code for causing a computer system to perform the steps of:
- determining values of item variables for a first set of items;
- constructing a first plan associated with a first goal according to the first set of items, and storing an indication that each item in the first set of items is active in the first plan;
- determining values of item variables for a second set of items;
- constructing a second plan associated with a second goal according to the second set of items, the second set of items including at least one common item from the first set of items, and storing an indication that each item in the second set of items is active in the second plan;
- determining a result for each plan according to the items active in the plan;
- determining an updated value for an item variable of the at least one common item, wherein a single copy of the common item is accessed for use in each of the first plan and the second plan;
- determining first updated result for the first plan according to the updated value for the item variable of the at least one common item, the first updated result specifying whether the first goal is achieved;
- determining second updated result for the second plan according to the updated value for the item variable of the at least one common item, the second updated result specifying whether the second goal is achieved; and
- displaying the first updated result and the second updated result.

7. The computer-readable medium of claim 6 further comprising:
- storing an indication that each item not in the second set of items is not active in the second plan.

8. The computer-readable medium of claim 7 further comprising:
- receiving an indication that an item not in the second set of items should be added to the second plan;
- storing an indication that the item is active in the second plan;
- determining a new result for the second plan according to the second set of items and the item for which an indication was received; and
- displaying the new result.

9. The computer-readable medium of claim 6 further comprising:
- receiving a new value of an item variable of one of the items in the first set of items;
- determining a new result for each plan including the item; and
- displaying the new result.

10. A system for managing computer-implemented multiple life cycle plans, each plan including at least one item, each item having at least one variable, the results of a plan depending on the values of variables of the items of the plan, the system comprising:
- processing means to:
  - collect values of item variables for a first set of items;
  - create a first plan associated with a first goal according to the first set of items, and storing an indication that each item in the first set of items is active in the first plan;
  - create a second plan associated with a second goal according to the second set of items, the second set of items including at least one common item from the first set of items, and storing an indication that each item in the second set of items is active in the second plan;
  - calculate a result for each plan according to the items active in the plan;

calculate a first updated result for the first plan according to an updated value for an item variable of the at least one common item, the first updated result specifying whether the first goal is achieved; and calculate a second updated result for the second plan according to the updated value for the item variable of the at least one common item, the second updated result specifying whether the second goal is achieved, wherein a single copy of the common item is accessed for use in each of the first plan and the second plan;

displaying means to display the updated results; and storing means to store the first set of items and the second set of items.

* * * * *